May 27, 1930.  H. G. LYKKEN  1,760,245
DEVICE FOR REDUCING AND FEEDING REDUCED MATERIALS
Filed March 22, 1926  2 Sheets-Sheet 1

Inventor:
Henry G. Lykken,
by Wallace R. Lane.
Atty.

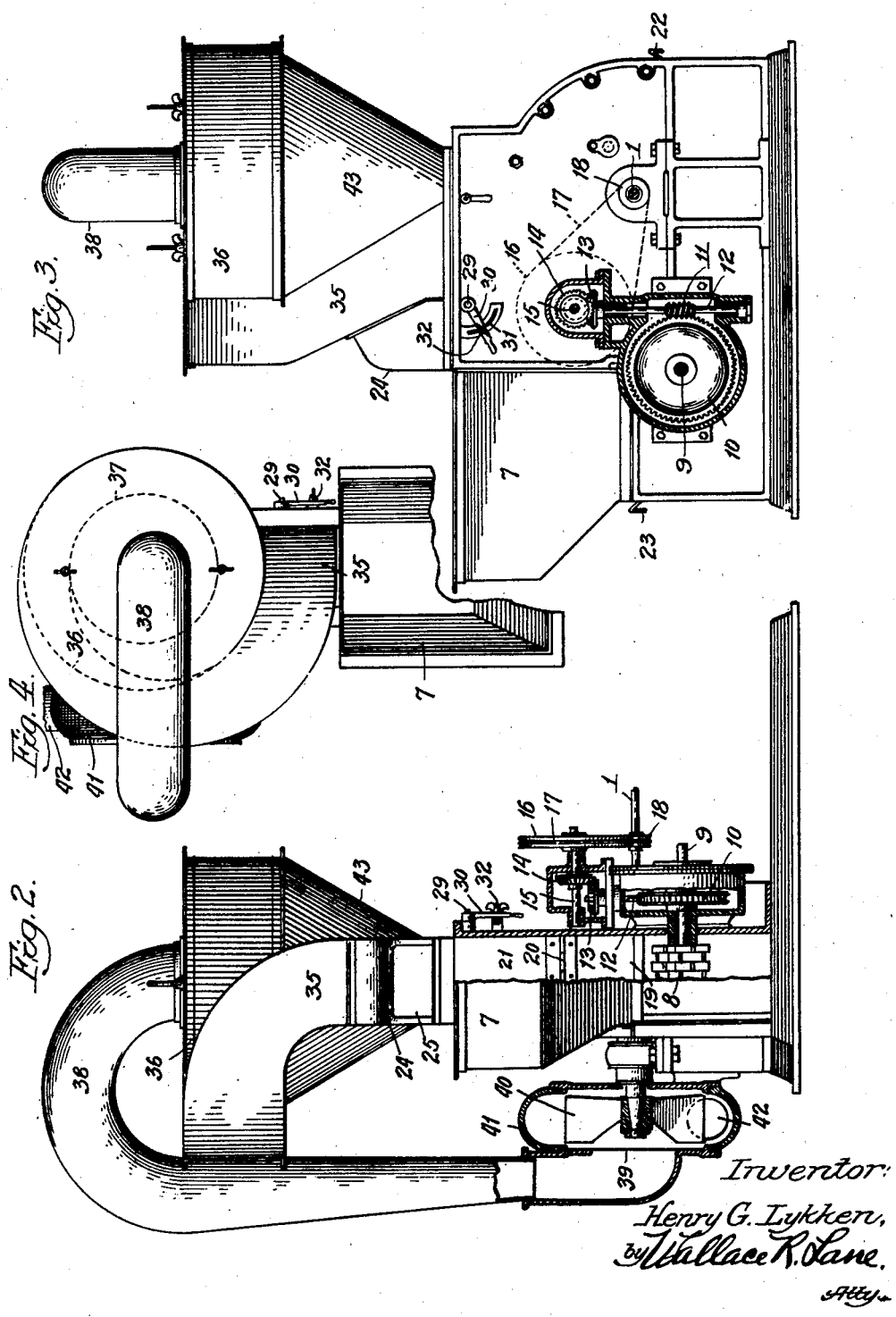

Patented May 27, 1930

1,760,245

UNITED STATES PATENT OFFICE

HENRY G. LYKKEN, OF MINNEAPOLIS, MINNESOTA

DEVICE FOR REDUCING AND FEEDING REDUCED MATERIALS

Application filed March 22, 1926. Serial No. 96,409.

The present invention relates to devices for reducing materials and supplying the reduced materials to a point of use, storage or the like.

Among the objects of the invention is to provide a novel reducing means having material supply means located to efficiently and readily supply the material to the lower part of the reducing means, as at the lower part of a reducing chamber and preferably below the reducing device therein, such as a rotor adapted to effect the whirl of air acting as a reducing eddy and applying centrifugal stresses upon the supplied material to effect reduction thereof. Preferably, the feeding or supplying of the material to be reduced is effected by a simple means and directly, as by a low built hopper at the front of the reducer and having an inclined bottom for causing the feed of the material normally by gravity from the hopper to the reducer and in such position that the same may be drawn thereinto by the action of the whirl in the reducing chamber.

Another object of the invention is to provide novel means for aiding and regulating the feed or supply of the material from the hopper to the reducer whereby proper supply will be insured should the gravity be changed. Preferably, this means comprises a rotary member or element adapted to rotate in the gravitationally moving material to aid its descent and to return excess material into the hopper when the supply space is filled with material. As another feature of this part of the invention, a relief means may be provided for yielding to large objects being returned by the regulating feeding means, whereby these objects may readily return into the hopper for re-feeding.

The invention also comprehends the object of feeding air or other supporter of combustion with the material, preferably to a point below the rotor and where the supplied material is entering the reducing chamber, such as to effectively draw the material into the reducing means at this point and to directly aid in the action of the air upon the material to be reduced. In this way the air may enter directly into the rotor for producing the whirl.

Another object of the invention is to provide the chamber of the reducing means with a collecting space at the lower part thereof for the settling of heavy and non-reducible objects or matter, where the same may accumulate and be withdrawn, when desired, through openings provided for that purpose. These openings are preferably normally closed.

A further object is to provide a unitary device for reducing and furnishing reduced material, such as fuel, with air, as a supporter of combustion, to a point of use, as in a combustion chamber of a furnace, boiler or the like. Such a means acting as a stoker is regarded as broadly new. The reducing means and the means for creating the air flow through the device as well as feeding the mixed reduced material and air, are preferably carried on and operated by a common driving means or element, such as a shaft extending through the reducing chamber and the casing of the exhaust-blower device, preferably, the separating means is located to one side but connected to the chamber and casing so as to be in the path of movement of the materials from the supply source to the point of use.

The invention comprehends other objects, advantages, capabilities and features as will later appear and are inherently possessed by the invention.

Referring to the drawings, Fig. 1 is a vertical sectional view taken transversely through a device constructed in accordance with the invention.

Fig. 2 is a front view partly in elevation and partly in broken section of the same.

Fig. 3 is a side or end view partly in elevation and partly in broken section of the same.

Figure 1:
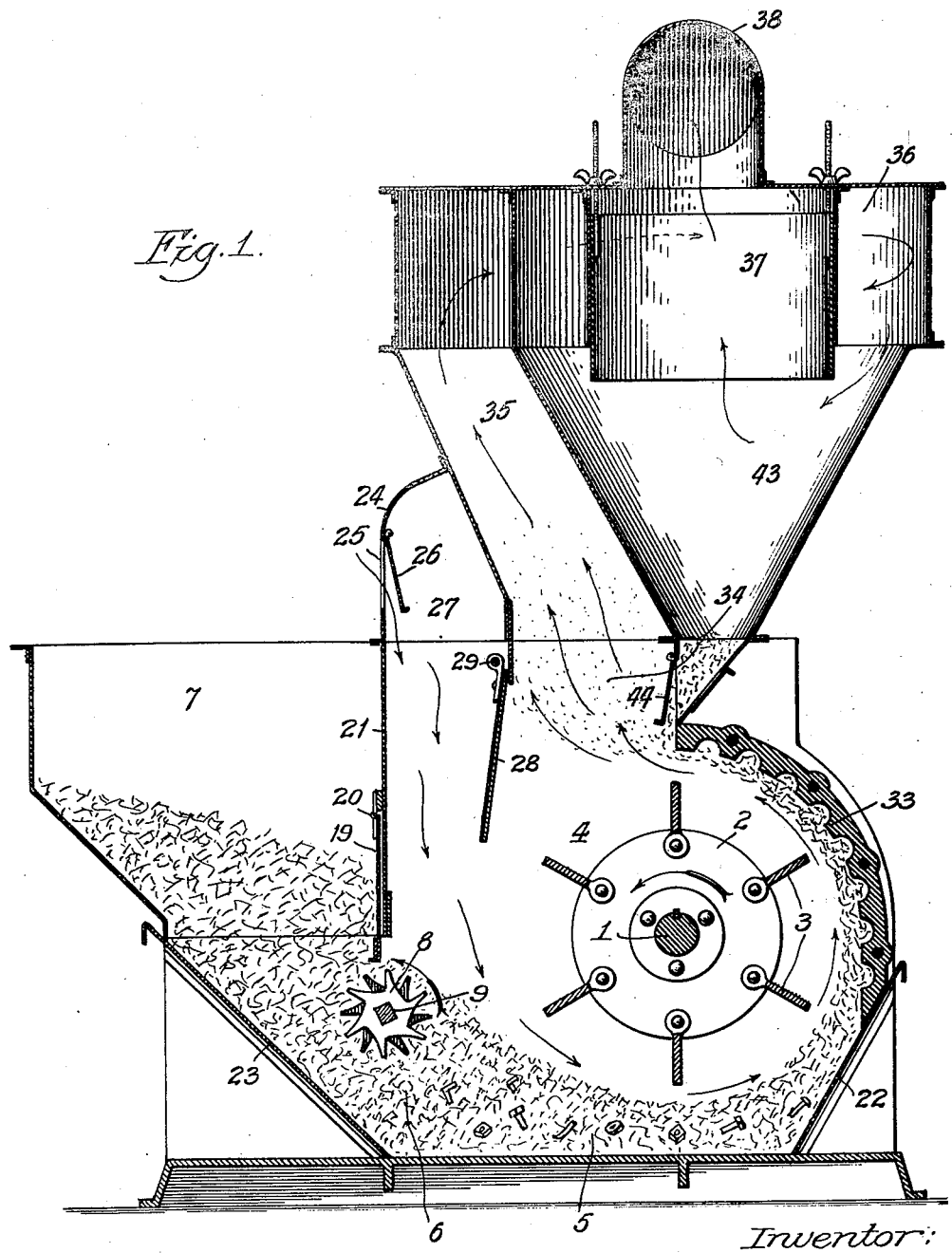

And, Fig. 4 is a top plan view of the device.

Referring now more in detail to the drawings, the embodiment selected to illustrate the invention is shown as comprising a common driving shaft 1 to which is secured a rotor 2 having radially extending eddy producing projections or arms 3 as clearly shown in Fig. 1 of the drawings. This rotor is located within a chamber 4 of sufficient space capacity to provide ample space between the peripheral path of the ends of the arms 3 and the walls of the chamber. The chamber has a lower space 5 into which may be fed by gravity material 6 passing from a hopper 7 located at the forward part of the chamber 4 and having an opening or discharge port at the lower part of the hopper and in communication with the lower part of the chamber 4.

Within the space of feed of the material is rotatably mounted a feeding roll or element 8 carried upon a shaft 9 extending to the exterior of the casing and driven by a worm gear 10 driven by a worm 11 on a shaft 12 carrying a driven bevel gear 13 driven by a similar gear 14 secured to a shaft 15 carrying a belt pulley 16. The latter is driven by a belt 17 passing over a driving pulley 18 connected to the shaft 1. In this way the feeding element 8 may be driven at a proportionate rate with the driving of the rotor 2 and by changing the relative sizes of the pulleys 16 and 18, the proportionate rates may be accordingly varied. The feeding element 8 is located in the opening between the hopper and the reducing chamber so as to aid, when rotating, in the gravitational descent or feeding of the material, should the angular repose not be sufficient for the movement of the material into the lower part of the reducing chamber. Should the feeding space be filled with material, the continued rotation of the member 8 will effect a return of excess material into the hopper as shown by the arrow appearing in Fig. 1 of the drawings. In some cases large objects may be returned by this member and to facilitate the same into the hopper, a release or yielding means 19 may be flexibly supported as by a hinge 20 to a wall 21 of the hopper, and extend in proximity to the upper part of the feed roll 8. Any large objects being returned by the latter may engage the lower end of the member 19 and cause the same to swing inwardly into the hopper and permit the objects to enter in the hopper to be refed with the material therein.

The space 5 in the lower part of the chamber 4 also serves as a collecting pocket or chamber in which non-reducible objects or material may settle and accumulate and later be withdrawn or removed through the openings of doors 22 and 23 at each side of this space, as desired.

In an upwardly extending portion 24 of the wall 21 is provided an opening 25 serving as an air entry port, this opening being regulated by a suitable door or gate 26 which may be adjusted to any desired position, or act as a mere check valve. The air entering this port leads into a passage 27 directing the flow of the air downwardly in front of the wall 24 and for delivery into the lower part of the chamber 4 and at the point where the material, to be reduced, enters into the lower space of the chamber 4 and below the rotor 2. The direction of the stream may be controlled or regulated by an adjustable baffle 28 pivotally supported upon a shaft 29 extending through the side walls of the casing, and having at one end thereof an adjusting arm 30 cooperating with a slotted sector 31 and set means 32, whereby the shaft 29 and baffle 28 may be secured in any desired adjusted relation or position.

At the rear and upper portion of the chamber 4 is provided a corrugated wall portion 33 adapted to act as a retard or anchor for the outer layers of the material moving in the chamber to the upper part thereof.

Above the forward portion of the rotor is a passage or throat 34 leading into a passage 35 of the separating device mounted about the reducing chamber. The reduced material and air pass upwardly therein and into a spiral passage 36 and through an adjusting sleeve 37 connected with a discharge pipe 38 leading to an eye 39 of an exhaust blower fan 40 rotatably supported in a casing 41 and having a discharge pipe or conduit 42 leading to a point of use or combustion. The fan 40 is secured to an end of the shaft 1 so that the shaft acts as a common driving element for both the rotor 2 and the fan 40. Below the spiral passage 37 is a cone chamber 43 having a discharge at the lower part thereof controlled by a gate 44 so that the heavier and larger particles of material separated from the material and air passing through the device may return into the reducing chamber for re-reduction.

In the operation of the device the material to be reduced is placed in the hopper 7 and by reason of the inclined bottom thereof, including the door 23, the material will move by gravity through the lower part of the hopper and through the discharge opening thereof and into the lower part of the chamber 4 and below the rotor 2. Should the material not feed sufficiently by gravity, the rotating feed roll will aid such movement and should the feed be too great, then the feed roll will return the excess material into the hopper for proper re-feeding. At the same time the exhaust action of the fan 40 will be transmitted back through the device into the chamber and draw a stream of air through the opening 25 into the passage 27 and be directed more or less toward the point of entry with the periphery of the rotor, by the regulating baffle 28. Both streams of air and material are drawn into the lower part of the chamber. The action of the rotor is to rapidly set up a whirl or eddy of air and at the same time effect a drawing or dragging action of the outer layers of the air so as to cause the surface layers of the material or those layers which are nearest to the peripheral path of the ends of the arms 3 of the rotor, to move in the direction of rotation of the rotor. Also, there will be centrifugal stresses effected against these layers so as to cause the particles of adjacent layers to rub against each other and reduce the same either by abrasion or attrition, or erosion. In this action the layers or strata of material nearest the rotor will be moving at a greater rate than those more remote therefrom, and the most remote layers, such as those in contact with the wall portion 33 will be retarded or entirely held stationary by the corrugations thereof as shown in the drawings. Any non-reducible matter or object fed into the lower part of the chamber will sink in the collecting space 5 similar to the sinking of rocks and the like in a glacier. When these objects have accumulated in the lower part of the chamber they may be removed through the opening of the doors 22 and 23.

The material being acted upon by the whirl of air will move with the stream of air moving upwardly through the throat 34 and passage 35 into the separating passage 36 where the finer and lighter particles will pass with the air through the adjusting sleeve 37 and passage 38 to the exhaust fan and blower 40, and the heavier and larger particles will fall by gravity to the lower end of the chamber 43 and be discharged through the opening at the lower end thereof for return into the reducing chamber where the same will be re-reduced with the materials entering at the front part thereof. If desired, the air entering the port 25 may be heated before arriving at the apparatus so that it may remove some of the moisture or all of the same from the particles passing upwardly through the separating means.

The separated particles and air are thoroughly mixed and pass into the exhaust blower which operates to force the same to the discharge 42 so as to feed or supply the combustible mixture to a point of combustion as in a combustion chamber of a furnace or boiler or the like. The action is that of a stoker for supplying, automatically, a fuel that may be reduced into a pulverized form and mixed with a smaller quantity of the supporter of combustion as may be regulated by the gate 26 toward the rate of rotation of the exhaust fan. The device is in the form of a unit having a common shaft driving the reducing and exhaust blower devices, and with the separating means in the path or passage of material from the source of material to the point of use thereof.

While I have herein described and upon the drawings shown an illustrative embodiment of the invention, it is to be understood that the invention is not limited thereto but comprehends other constructions, arrangements of parts, details and features, without departing from the spirit thereof.

Having thus disclosed the invention, I claim:

1. A reducing device having a reducing chamber, means for causing a vertical cyclonic action in the chamber for reducing the material supplied to said chamber, and means for supplying the material to the lower part of said chamber.

2. A reducing device having a reducing chamber, means for causing a cyclonic action in the air in the chamber for reducing the material supplied to said chamber, means for supplying the material to the lower part of said chamber, and feeding means in coordinated relation with said means for regulating the supply of said material.

3. A reducing device comprising a reducing chamber, a horizontal rotor therein for effecting the reduction of material supplied to the chamber by causing a whirling action of the air in the chamber, and means for supplying the material to the lower part of said chamber and below said rotor.

4. A reducing device comprising a reducing chamber, means for causing an upwardly moving circulation of air at high velocity therein for reducing the material supplied to said chamber, means for supplying the material to the lower part of said chamber and below said reducing means, means for supplying air to the rotor in the lower part thereof for effecting the action of the air upon the material being supplied.

5. A reducing device having a reducing chamber, means for producing a cyclonic action of the air in the chamber for reducing the material supplied to said chamber, means for supplying the material to the lower part of said chamber and below said reducing means, means for supplying air to the rotor in the lower part thereof and above the material supplied below said reducing means for effecting the action of the air upon the material being supplied, and means for adjusting the air supply.

6. A reducing device comprising a reducing chamber, means therein for reducing the material supplied to said chamber, and means for supplying the material to the lower part of said chamber and below said reducing means, said chamber having space in the lower part thereof for the collection of non-reducible matter.

7. A reducing device comprising a reducing chamber, means therein for reducing the material supplied to said chamber, means for supplying the material to the lower part of said chamber and below said reducing means, said chamber having space in the lower part thereof for the collection of non-reducible matter, and means at the lower part of said chamber for normally closing the same but affording access thereto for removing the collected non-reducible matter.

8. A reducing device having a reducing chamber, and having a material supply opening in a low part therof, a fan in the chamber and located to be above the material supplied therein through said opening for causing a vorticose action of the air in the chamber for reducing the material therein, and means for supplying material into said chamber through said opening.

9. A reducing device comprising a reducing chamber, having a supply opening in a low part thereof, a reducing rotor in the chamber and located to be above the material supplied therein through said opening, and a hopper having an inclined bottom for supplying the material by gravity through said opening.

10. A reducing device comprising a reducing chamber, having a supply opening in a low part thereof, a reducing rotor in the chamber and located to be above the material supplied therein through said opening, a hopper having an inclined bottom for supplying the material by gravity through said opening, and a rotary feeding member in said opening and above said inclined bottom for aiding and regulating the supplying of said material.

11. A reducing device comprising a reducing chamber, having a supply opening in a low part thereof, a reducing rotor in the chamber and located to be above the material supplied therein through said opening, a hopper having an inclined bottom for supplying the material by gravity through said opening, a rotary feeding member in said opening and above said inclined bottom for aiding and regulating the supplying of said material, and relief means associated with said hopper and said feeding means for permitting return of material into said hopper when said feeding means is overfeeding.

12. A unitary device for stoking powdered fuel comprising a drive shaft, an air moving rotor mounted on said shaft, a reducing chamber surrounding the rotor, means for supplying material to be reduced to the lower part of said chamber and below said rotor, a blower rotor mounted on said shaft, a casing and discharge for the rotor, and separating means connected between said chamber and said casing.

13. A unitary fuel reducing and stoking device, comprising a reducing chamber, a shaft extending through said chamber, an air moving rotor mounted on said shaft and in said chamber, means for supplying fuel to be reduced below said rotor, an exhaust blower mounted on said shaft and having a discharge means for conducting particles of reduced fuel and air to a locus of combustion, and separating means comprising a separating and mixing chamber and connected between said chamber and said exhaust blower.

14. A unitary device for reducing and feeding combustible material to a place of combustion, comprising a passage having a series of chambers, said passage leading from a supply of material to be reduced to a place of combustion, means for supplying a stream of said material into one of said chambers, means for supplying a stream of air into said chamber, a rotor in said chamber adapted to create a whirl of air therein to caues the air to act upon said material to reduce the same, separating means in another of said chambers, an exhaust and blower means in a third of said chambers, and a shaft extending through the rotor chamber and the blower chamber, said rotor and blower means being mounted on said shaft.

15. A reducing device having a reducing chamber, a horizontal rotor therein for causing a circulation of the air in the chamber for effecting reduction of material supplied to the chamber, means for supplying the material to the lower part of said chamber and below said rotor, and feeding means in coordinate relation with said means for regulating the supply of said material.

16. A reducing device comprising a reducing chamber, a rotor therein for causing a circulation of air for effecting reduction of material supplied to the chamber, means for supplying the material to the lower part of said chamber and below said rotor, feeding means for regulating the supply of said material, and driving means for the rotor and having driving connections to said feeding means to operate the same at given rates.

In witness whereof, I hereunto subscribe my name to this specification.

HENRY G. LYKKEN.